United States Patent
Takeda et al.

(10) Patent No.: US 10,873,979 B2
(45) Date of Patent: Dec. 22, 2020

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Yousuke Sano, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 26 days.

(21) Appl. No.: 16/300,386

(22) PCT Filed: May 11, 2017

(86) PCT No.: PCT/JP2017/017772
§ 371 (c)(1),
(2) Date: Nov. 9, 2018

(87) PCT Pub. No.: WO2017/195849
PCT Pub. Date: Nov. 16, 2017

(65) Prior Publication Data
US 2019/0110316 A1    Apr. 11, 2019

(30) Foreign Application Priority Data

May 12, 2016 (JP) ................................. 2016-096438

(51) Int. Cl.
*H04W 74/08* (2009.01)
*H04W 72/04* (2009.01)
(Continued)

(52) U.S. Cl.
CPC ......... *H04W 74/085* (2013.01); *H04W 24/10* (2013.01); *H04W 72/04* (2013.01);
(Continued)

(58) Field of Classification Search
None
See application file for complete search history.

(56) References Cited

U.S. PATENT DOCUMENTS

| 2013/0223299 A1* | 8/2013 | Yang | H04L 1/1812 370/280 |
| 2014/0119331 A1* | 5/2014 | Ji | H04W 72/02 370/330 |

(Continued)

FOREIGN PATENT DOCUMENTS

EP    3301984 A1 *   4/2018   ............ H04W 52/50

OTHER PUBLICATIONS

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

(Continued)

*Primary Examiner* — Chi H Pham
*Assistant Examiner* — Vladislav Y Agureyev
(74) *Attorney, Agent, or Firm* — Osha Bergman Watanabe & Burton LLP

(57) ABSTRACT

The present invention is designed to reduce the latency due to collisions in UL transmission when contention-based UL data transmission is employed. A user terminal communicates using a second transmission time interval (TTI), having a shorter TTI duration than a first TTI, and this user terminal has a transmission section that transmits multiple UL data without a UL grant from a radio base station, and a control section that controls allocation of the multiple UL data individually, and the control section applies frequency hopping to allocate the multiple UL data to resources of different second TTIs.

4 Claims, 16 Drawing Sheets

(51) Int. Cl.
*H04W 76/14* (2018.01)
*H04W 24/10* (2009.01)
*H04W 72/12* (2009.01)

(52) U.S. Cl.
CPC ..... *H04W 72/042* (2013.01); *H04W 72/0446* (2013.01); *H04W 72/1284* (2013.01); *H04W 74/08* (2013.01); *H04W 74/0891* (2013.01); *H04W 76/14* (2018.02)

(56) References Cited

U.S. PATENT DOCUMENTS

| | | | | |
|---|---|---|---|---|
| 2015/0036604 A1* | 2/2015 | Park | ............ | H04L 5/0037 370/329 |
| 2015/0256308 A1* | 9/2015 | Ma | ............ | H04L 5/001 370/330 |
| 2017/0055234 A1* | 2/2017 | Seo | ............ | H04W 72/0446 |
| 2017/0127435 A1* | 5/2017 | Rong | ............ | H04W 72/042 |
| 2017/0223686 A1* | 8/2017 | You | ............ | H04L 5/0048 |
| 2017/0257898 A1* | 9/2017 | Maaref | ............ | H04W 76/14 |
| 2017/0290052 A1* | 10/2017 | Zhang | ............ | H04L 1/1896 |
| 2017/0367110 A1* | 12/2017 | Li | ............ | H04W 72/1268 |
| 2018/0035329 A1* | 2/2018 | Futaki | ............ | H04W 28/06 |
| 2018/0083751 A1* | 3/2018 | Seo | ............ | H04L 27/26 |
| 2018/0124715 A1* | 5/2018 | Xu | ............ | H04W 52/283 |
| 2018/0242347 A1* | 8/2018 | Sahlin | ............ | H04W 72/0446 |
| 2018/0338319 A1* | 11/2018 | Kim | ............ | H04W 72/044 |
| 2019/0007175 A1* | 1/2019 | Kwak | ............ | H04L 1/1812 |
| 2019/0029030 A1* | 1/2019 | Zou | ............ | H04W 72/0446 |
| 2019/0037562 A1* | 1/2019 | Park | ............ | H04L 5/0048 |
| 2019/0074936 A1* | 3/2019 | Lee | ............ | H04W 72/14 |

OTHER PUBLICATIONS

International Search Report issued for PCT/JP2017/017772, dated Aug. 1, 2017 (4 pages).
Written Opinion issued for PCT/JP2017/017772, dated Aug. 1, 2017 (7 pages).
Extended European Search Report issued in counterpart European Patent Application No. 17796207.3, dated Nov. 11, 2019 (5 pages).
Lenovo; "Design of UL channels for shortened TTI"; 3GPP TSG RAN WG1 Meeting #84b, R1-162739; Busan, Korea; Apr. 11-15, 2016 (4 pages).
Nokia Networks et al.; "DMRS for PUSCH with short TTI"; 3GPP TSG-RAN WG1 Meeting #84, R1-160779; Malta, Feb. 15-19, 2016 (5 pages).

* cited by examiner

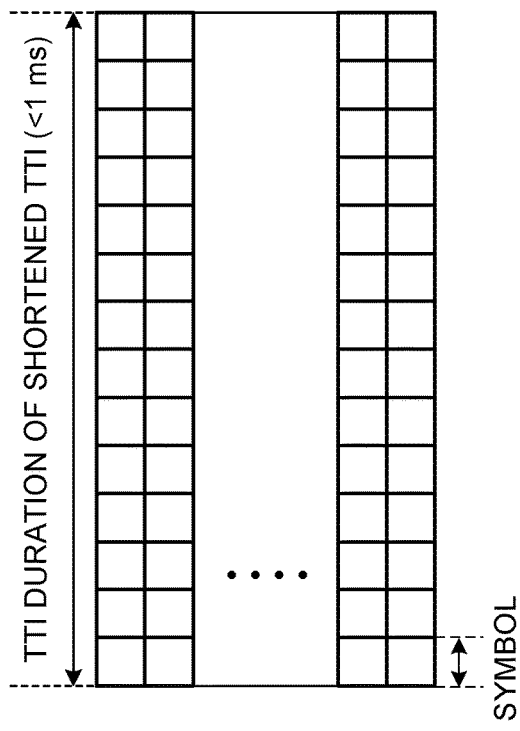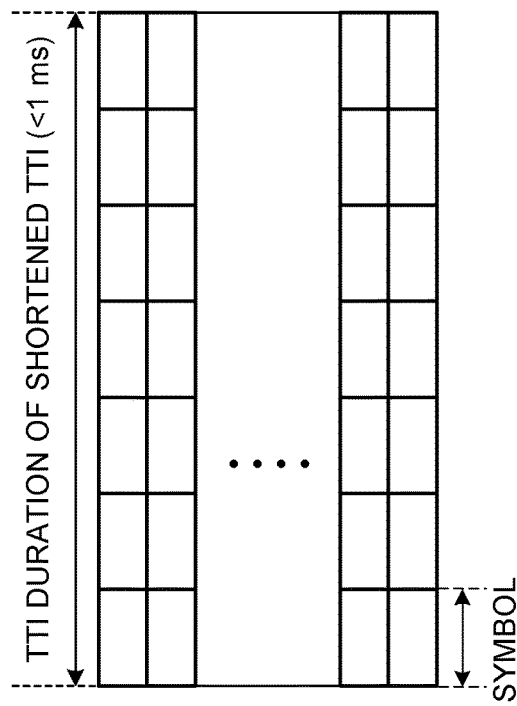
FIG. 2A
FIG. 2B

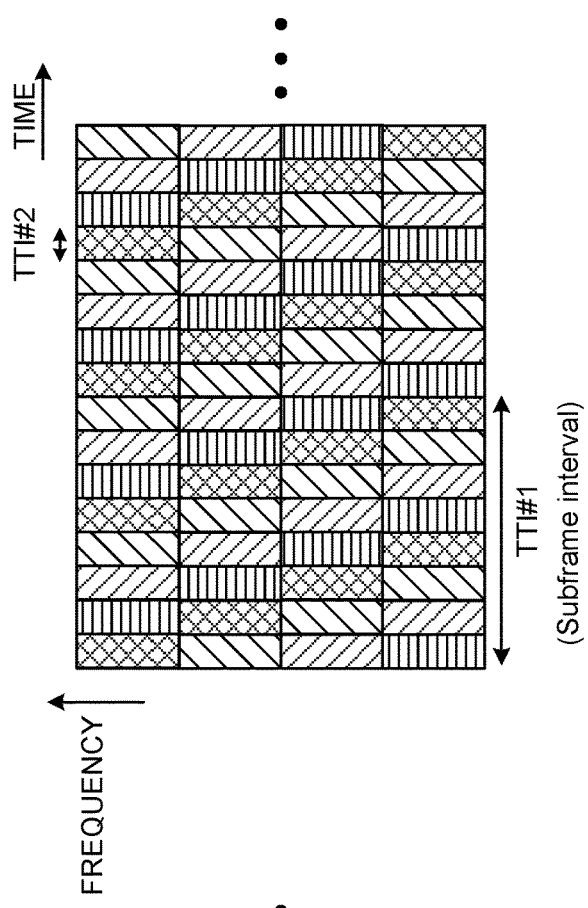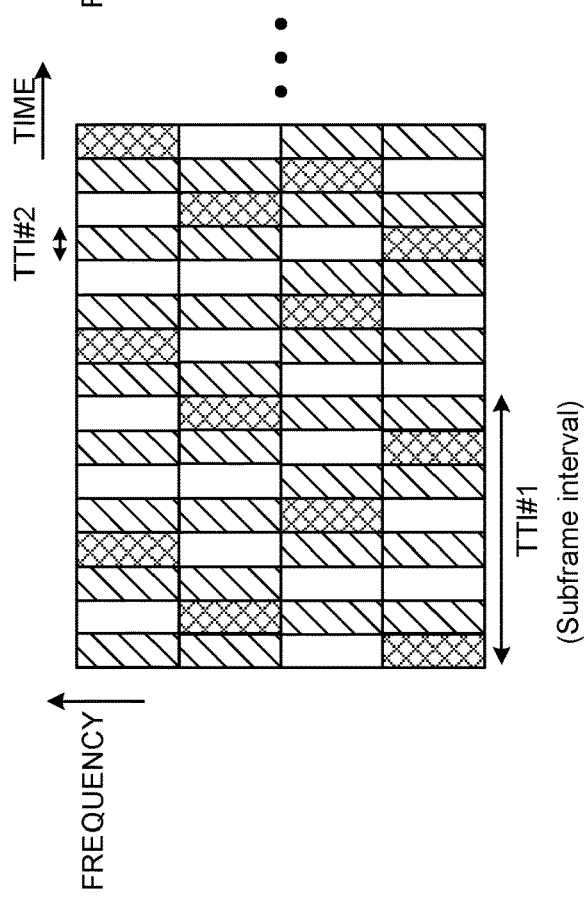

USER TERMINAL AND RADIO COMMUNICATION METHOD

TECHNICAL FIELD

The present invention relates to a user terminal and a radio communication method in next-generation mobile communication systems.

BACKGROUND ART

In the UMTS Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), when UL synchronization is established between a radio base station and a user terminal, UL data can be transmitted from the user terminal. For this reason, in existing LTE systems, random access procedures (also referred to as "RACH procedures (Random Access CHannel Procedures)," "access procedures," and so on) for establishing UL synchronization are supported.

In random access procedures, a user terminal acquires information related to UL transmission timing (timing advance (TA)) from a response (random access response), which a radio base station returns in response to transmission of a random access preamble (PRACH), and establishes UL synchronization based on this TA.

After UL synchronization is established, the user terminal receives downlink control information (DCI) (UL grant) from the radio base station, and then transmits UL data using the UL resource allocated by the UL grant.

Furthermore, in existing systems, the transmission time intervals (TTIs), which are applied to DL transmission and UL transmission between radio base stations and user terminals, are configured to one ms and controlled. The transmission time intervals are also referred to as "communication time intervals," and TTIs in LTE systems (Rel. 8 to 12) are also referred to as "subframe durations."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In future radio communication systems (for example, 5G, NR, etc.), it is desirable to accommodate various services such as high-speed and large-capacity communication (eMBB (enhanced Mobile Broad Band)), massive access (mMTC (massive MTC)) from devices (user terminal) for inter-device communication (M2M (Machine-to-Machine)) such as IoT (Internet of Things) and MTC (Machine Type Communication), and low-latency, reliable communication (URLLC (Ultra-Reliable and Low Latency Communication)), in a single framework.

Reduction of communication delay (latency reduction) is being studied in order to provide sufficient communication services in such future radio communication systems. For example, a study is in progress to make transmission time intervals (TTIs) that serve as minimum time units (for example, as the minimum time unit in scheduling, the time unit in which one transport block is mapped, etc.) shorter than 1 ms, which is the case in existing LTE systems (LTE Rel. 8 to 12), and carry out communication by using these TTIs (which may be referred to as, for example, "shortened TTIs"). Although, hereinafter, the transmission time interval to serve as the minimum time unit will be referred to as "TTIs," in future radio communication system will be referred to as "subframes," "subframe intervals" and so on.

In such future radio communication systems, if random access procedures are performed in the same way as in existing LTE systems before UL data is transmitted, the latency time before UL data starts being transmitted will pose a problem. Also, in future radio communication systems, there is a possibility that the growth of overhead due to UL grants from radio base stations will pose a problem.

Therefore, envisaging future radio communication systems, there is an on-going study to perform communication by allowing contention of UL transmission by multiple user terminals, in order to shorten the latency time before UL data starts being transmitted, and to reduce the increase of overhead. For example, a study is in progress to allow a user terminal to transmit UL data without a UL grant from a radio base station (also referred to as "contention-based UL data transmission," "UL grant-less (-free) UL transmission," "UL grantless and contention-based UL data transmission," "RACH-less (-free) UL transmission," etc.).

Meanwhile, when the user terminal transmits UL data by applying contention-based UL data transmission, there is a high possibility that this transmission in contention-based UL data transmission will collide with other UL transmissions (for example, other UL transmissions that are made based on UL grants) and fail. In this case, even if contention-based UL data transmission is applied, sufficient latency reduction may not be achieved in the system The present invention has been made in view of the above, and it is therefore an object of the present invention to provide a user terminal and a radio communication method, whereby the latency due to UL transmission collisions can be reduced when contention-based UL transmission is employed.

Solution to Problem

According to one aspect of the present invention, a user terminal communicates using a second transmission time interval (TTI), having a shorter TTI duration than a first TTI, and this user terminal has a transmission section that transmits multiple UL data without a UL grant from a radio base station, and a control section that controls allocation of the multiple UL data individually, and the control section applies frequency hopping to allocate the multiple UL data to resources of different second TTIs.

Advantageous Effects of Invention

According to the present invention, it is possible to prevent the latency due to UL transmission collisions when contention-based UL data transmission is employed.

BRIEF DESCRIPTION OF DRAWINGS

FIGS. 2A and 2B are diagrams to show example configurations of shortened TTIs;

FIGS. 8A and 8B are diagrams to show other examples of frequency hopping patterns that are configured in UL resources for shortened TTIs;

DESCRIPTION OF EMBODIMENTS

As mentioned earlier, future radio communication systems such as LTE Rel. 13 and later versions, 5G and others are anticipated to accommodate various services such as high-speed and large-capacity communication (eMBB (enhanced Mobile Broad Band)), massive access (mMTC (massive MTC)) from devices (user terminals) for inter-device communication (M2M (Machine-to-Machine)) such as IoT (Internet of Things) and MTC (Machine Type Communication), and low-latency, reliable communication (URLLC (Ultra-Reliable and Low Latency Communication)), in a single framework.

Figure 1:
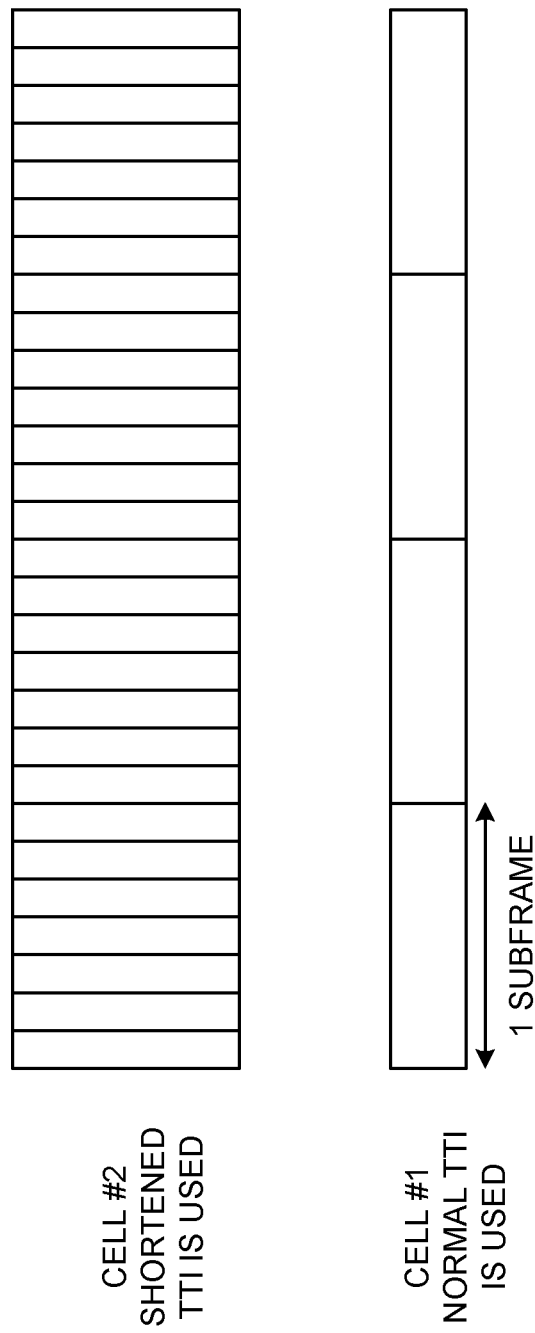
FIG. 1 is a diagram to explain normal TTIs and shortened TTIs.

Particularly, in URLLC and so on, latency reduction in communication is required. Therefore, in future communication systems, it may be possible to perform communication using shortened TTIs, which are TTIs shorter than 1 ms (see FIG. 1). FIG. 1 shows a cell #1 that uses normal TTIs (1 ms) and a cell #2 that uses shortened TTIs. Furthermore, studies are in progress on a configuration for reducing the number of symbols per subframe, and a configuration for reducing the symbol duration itself by expanding the subcarrier period and so on, when shortened TTIs are used.

When TTIs of a shorter time length than normal TTIs (hereinafter referred to as "shortened TTIs") are used, the time margin for processing (for example, encoding and decoding) in the user terminal and the radio base station increases, so that the processing delay can be reduced. Also, when shortened TTIs are used, it is possible to increase the number of user terminals that can be accommodated per unit time (for example, 1 ms). Below, the configuration of shortened TTIs and so on will be explained.

(Configuration Examples of Shortened TTIs)

Configuration examples of shortened TTIs will be described with reference to FIG. 2. As shown in FIG. 2A and FIG. 2B, shortened TTIs have a time duration (TTI durations) shorter than 1 ms. Shortened TTIs may have one TTI duration or multiple TTI durations, whose multiples are 1 ms, such as 0.5 ms, 0.25 ms, 0.2 ms, 0.125 ms and 0.1 ms, for example. Alternatively, when a normal CP is used, a normal TTI contains 14 symbols, so that one TTI duration or multiple TTI durations, whose multiples are integral multiples of 1/14 ms, such as 7/14 ms, 4/14 ms, 3/14 ms, 2/14 ms and 1/14 ms, may be used. Also, when an extended CP is used, a normal TTI contains 12 symbols, so that one TTI duration or multiple TTI durations, whose multiples are integral multiples of 1/12 ms, such as 6/12 ms, 4/12 ms, 3/12 ms, 2/12 ms and 1/12 ms, may be used.

Also, in shortened TTIs, as in conventional LTE, whether to use a normal CP or use an extended CP can be configured with higher layer signaling such as broadcast information and RRC signaling. By this means, it is possible to introduce shortened TTIs, while maintaining compatibility (synchronization) with 1 ms normal TTIs.

Note that, although FIG. 2A and FIG. 2B illustrate example cases of using normal CPs, this is by no means limiting. A shortened TTI needs only be a shorter time duration than a normal TTI, and the number of symbols in the shortened TTI, the duration of symbols, the duration of CPs and suchlike configurations can be determined freely. Also, although examples will be described below in which OFDM symbols are used in the DL and SC-FDMA symbols are used in the UL, the present invention is not limited thereto. For example, when OFDM is applied to UL, OFDM symbols may be used.

FIG. 2A is a diagram to show a first example configuration of shortened TTIs. As shown in FIG. 2A, in the first configuration example, a shortened TTI is comprised of 14 OFDM symbols (or SC-FDMA symbols), which is equal in number to a normal TTI, and each OFDM symbol (each SC-FDMA symbol) has a symbol duration shorter than the symbol duration of a normal TTI (=66.7 μs).

As shown in FIG. 2A, when maintaining the number of symbols in a normal TTI and shortening the symbol duration, the physical layer signal configuration (arrangement of REs, etc.) of normal TTIs can be reused. In addition, when maintaining the number of symbols in a normal TTI, it is possible to include, in a shortened TTI, the same amount of information (the same amount of bits) as in a normal TTI. On the other hand, since the symbol time duration differs from that of normal TTI symbols, it is difficult, as shown in FIG. 2A, to frequency-multiplex a signal with shortened TTIs and a signal with normal TTIs in the same system band (or the cell, the CC, etc.).

Also, since the symbol duration and the subcarrier period are each the reciprocal of the other, as shown in FIG. 2A, when shortening the symbol duration, the subcarrier period is wider than the 15-kHz subcarrier period of normal TTIs.

When the subcarrier period becomes wider, it is possible to effectively suppress the inter-channel interference caused by the Doppler shift when the user terminal moves and the communication quality degradation due to phase noise in the receiver of the user terminal. In particular, in high frequency bands such as several tens of GHz, the deterioration of communication quality can be effectively prevented by expanding the subcarrier spacing.

FIG. 2B is a diagram to show a second example configuration of a shortened TTI. As shown in FIG. 2B, according to the second configuration example, a shortened TTI is comprised of a smaller number of OFDM symbols (or SC-FDMA symbols) than a normal TTI, and each OFDM symbol (each SC-FDMA symbol) has the same symbol duration as that of a normal TTI (=66.7 µs). In this case, a shortened TTI can be comprised of symbol units in normal TTIs (a configuration in which the number of symbols is reduced). For example, a shortened TTI can be formed by using some of the 14 symbols included in one subframe. In FIG. 2B, a shortened TTI is comprised of seven OFDM symbols (SC-FDMA symbols), which is half of a normal TTI.

As shown in FIG. 2B, when reducing the symbol duration and reducing number of symbols, the amount of information (the amount of bits) included in a shortened TTI can be reduced lower than in a normal TTI. Therefore, the user terminal can perform the receiving process (for example, demodulation, decoding, etc.) of the information included in a shortened TTI in a shorter time than a normal TTI, and therefore the processing delay can be shortened. Moreover, by making the symbol duration the same as in existing systems, shortened-TTI signals and normal-TTI signals can be frequency-multiplexed in the same system band (or carrier, cell, CC, etc.), and compatibility with normal TTIs can be maintained.

Furthermore, in future radio communication, it may be possible to run multiple services with different numerologies (for example, with different TTI durations applied) in the same carrier, in order to use frequencies effectively. For example, it may be possible to run a new RAT carrier (frequency, cell, CC, etc.) by accommodating user terminals that communicate based on different numerologies (for example, user terminals to use MBB, IoT, URLLC, etc.) at the same time.

In such future radio communication systems, it is necessary to shorten the latency time it takes before UL data starts being transmitted, and to reduce the increase of overhead. In order to provide a resolution to this problem, contention-based UL data transmission (also referred to as "contention-based UL data transmission"), in which contention of UL transmission by multiple user terminals is allowed, and in which UL data is transmitted without UL grants from radio base stations, is under research. For contention-based UL data transmission, UL transmission can be performed without using existing PRACH procedures. An example of existing PRACH procedures will be described with reference to FIG. 3A, and an example of contention-based UL data transmission will be described with reference to FIG. 3B.

Figure 3A:
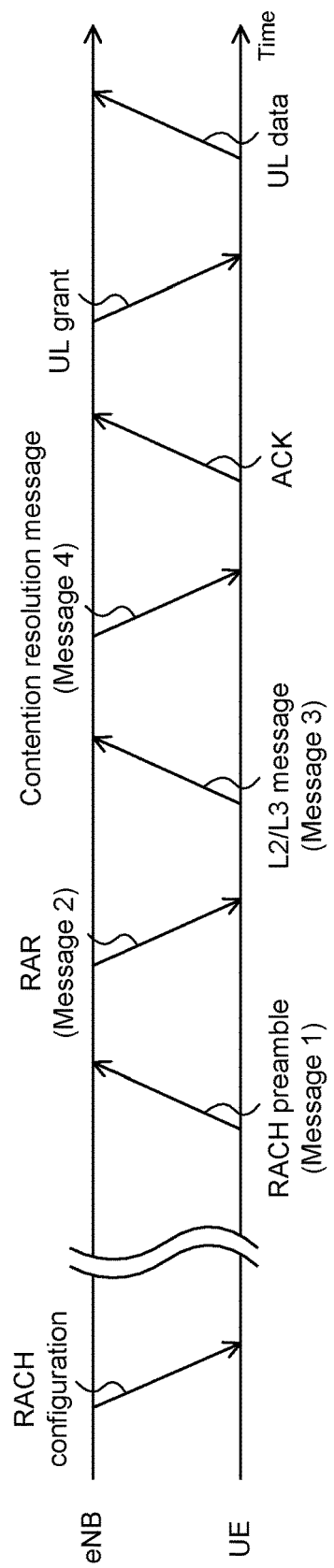
FIGS. 3A and 3B are diagrams to show examples of random access procedures in existing systems and contention-based UL data transmission.

FIG. 3A is a diagram to show an example of contention-based random access procedures. In FIG. 3A, a user terminal receives, in advance, information (PRACH configuration information) that indicates the configuration of a random access channel (PRACH) (PRACH configuration, RACH configuration, etc.), via system information (for example, the MIB (Mater Information Block) and/or SIBs (System Information Blocks)), higher layer signaling (for example, RRC (Radio Resource Control) signaling) and so on.

As shown in FIG. 3A, when the user terminal transitions from idle mode (RRC_IDLE) to RRC-connected mode (RRC_CONNECTED) (for example, when gaining initial access), if UL synchronization is not established despite the fact that the user terminal is in RRC-connected mode (for example, when UL transmission is started or resumed), the user terminal randomly selects one of a plurality of preambles that are indicated in the PRACH configuration information, and transmits the selected preamble using the PRACH (message 1).

Upon detecting the preamble, the radio base station transmits a random access response (RAR) (message 2) in response to that. After transmitting the preamble, the user terminal attempts to receive an RAR for a predetermined period (RAR window). If the user terminal fails to receive an RAR, the user terminal increases the transmission power of the PRACH and transmits (retransmits) the preamble again. Note that the act of increasing the transmission power upon retransmission is also referred to as "power ramping."

Upon receiving the RAR, the user terminal adjusts the transmission timing in the UL based on the timing advance (TA) that is included in the RAR, and establishes UL synchronization. Furthermore, the user terminal transmits a higher layer (L2/L3: layer 2/layer 3) control message (message 3) in the UL resource specified by the UL grant included in the RAR. This control message contains the user terminal's identifier (UE-ID). The user terminal's identifier may be, for example, a C-RNTI (Cell-Radio Network Temporary Identifier) in the event the user terminal is in RRC-connected mode, or may be a higher layer UE-ID such as an S-TMSI (System Architecture Evolution-Temporary Mobile Subscriber Identity) in the event the user terminal is in idle mode.

In response to the higher layer control message, the radio base station sends a contention-resolution message (message 4). The contention-resolution message is transmitted based on the above-mentioned user terminal identifier included in the control message. Upon successfully detecting the contention-resolution message, the user terminal transmits an HARQ (Hybrid Automatic Repeat reQuest)-based positive acknowledgment (ACK) to the radio base station. By this means, the user terminal in idle mode transitions to RRC-connected mode.

On the other hand, if the user terminal fails to detect the contention-resolution message, the user terminal judges that contention has occurred, reselects a preamble, and repeats random access procedures from message 1 to message 4. When learning from an ACK from the user terminal that the contention has been resolved, the radio base station transmits a UL grant to the user terminal. The user terminal starts transmitting UL data using the UL resource allocated by the UL grant.

According to the above-described contention-based random access, if the user terminal desires to transmit UL data, the user terminal can voluntarily (autonomously) start random access procedures. Also, since UL synchronization is established first and then UL data is transmitted using a UL resource that is allocated by a UL grant in a user terminal-specific manner, reliable UL transmission is made possible.

Meanwhile, when contention-based random access is gained in the same way as in existing LTE systems before UL data is transmitted, the latency time before the UL data transmission is started may pose a problem. Also, in future radio communication systems, if, before UL data is transmitted, a user terminal needs to request allocation of UL resources (that is, send a scheduling request (SR)) or a radio base station needs to allocate UL resources (that is, send a UL grant), the growth of overhead is likely to pose a problem.

In order to provide a resolution to this problem, contention-based UL data transmission (also referred to as "contention-based UL data transmission"), in which contention of UL transmission by multiple user terminals is allowed, and in which UL data is transmitted without UL grants from radio base stations, is under research.

Figure 3B:
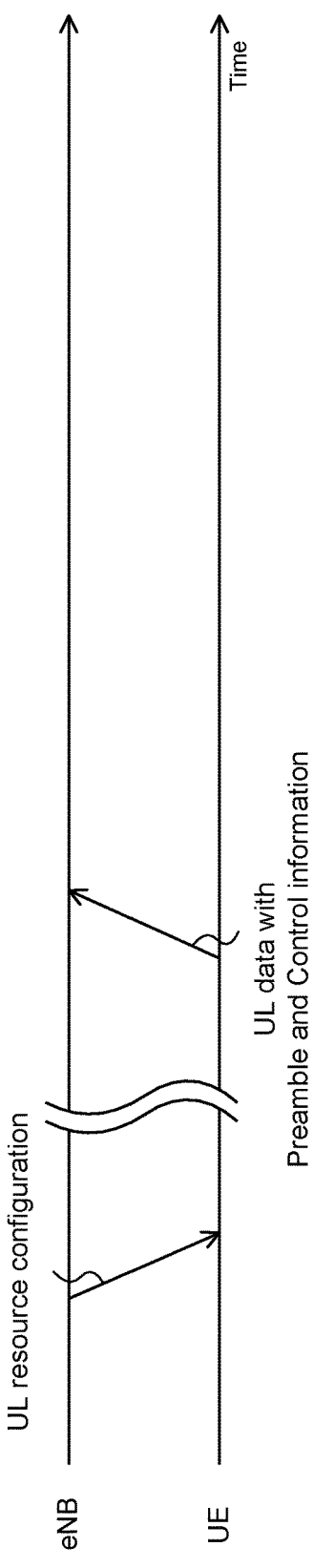

As shown in FIG. 3B, a user terminal may receive configuration information related to contention-based UL transmission (CBUL), in advance, via system information (for example, the MIB and/or SIBs), higher layer signaling (for example, RRC signaling) and so on.

Here, the configuration information related to contention-based UL data transmission (CBUL) (hereinafter also referred to as "CBUL configuration information," "UL resource configuration information," etc.) may indicate at least one of a plurality of preambles from which the user terminal can make selections, and UL resources (time and/or frequency resources) for contention-based UL data transmission. These UL resources may be indicated by using at least one of, for example, SFNs, subframe numbers, the number of frequency resources (the number of PRBs), frequency offsets, and UL resource subframe intervals.

As shown in FIG. 3B, the user terminal starts transmitting UL data without receiving a UL grant from a radio base station. To be more specific, when the user terminal transmits UL data upon an event of new UL transmission, the user terminal may transmit a preamble, which is randomly selected, and control information pertaining to the UL data, together. Furthermore, the user terminal may transmit the above control information and UL data without a response from the radio base station to the preamble.

As shown in FIG. 3B, in contention-based UL data transmission, contention of UL data from a plurality of user terminals is permitted, so that it is possible to skip messages 2 to 4 (see FIG. 3A) in the above-described contention-based random access. This will shorten the latency time before UL data starts being transmitted. Also, since UL data is transmitted without UL grants from the radio base station, overhead can be reduced.

Meanwhile, when the user terminal transmits UL data by applying contention-based UL data transmission, cases may occur where this UL data cannot be received on the radio base station side. In particular, when multiple user terminals adopt contention-based UL transmission, due to the contention of UL data transmitted from varying terminals, the radio base station is more likely to fail receipt. In this case, even if contention-based UL data transmission is applied to transmit data (traffic) that requires latency reduction, latency may be produced as a result.

Also, it is conceivable that multiple pieces of UL data are transmitted in repetition. For example, it is likely that the user terminal repeatedly transmits multiple pieces of UL data (which may be the same data or different data) in consecutive shortened TTIs without UL grants from the radio base station. However, even if multiple pieces of UL data, to which contention-based UL data transmission is applied, are transmitted in multiple shortened TTIs, if an existing PUSCH is allocated over the subframe where these multiple shortened TTIs are included, there is a possibility that these multiple pieces of UL data collide with existing UL data (see FIG. 4).

Figure 4:
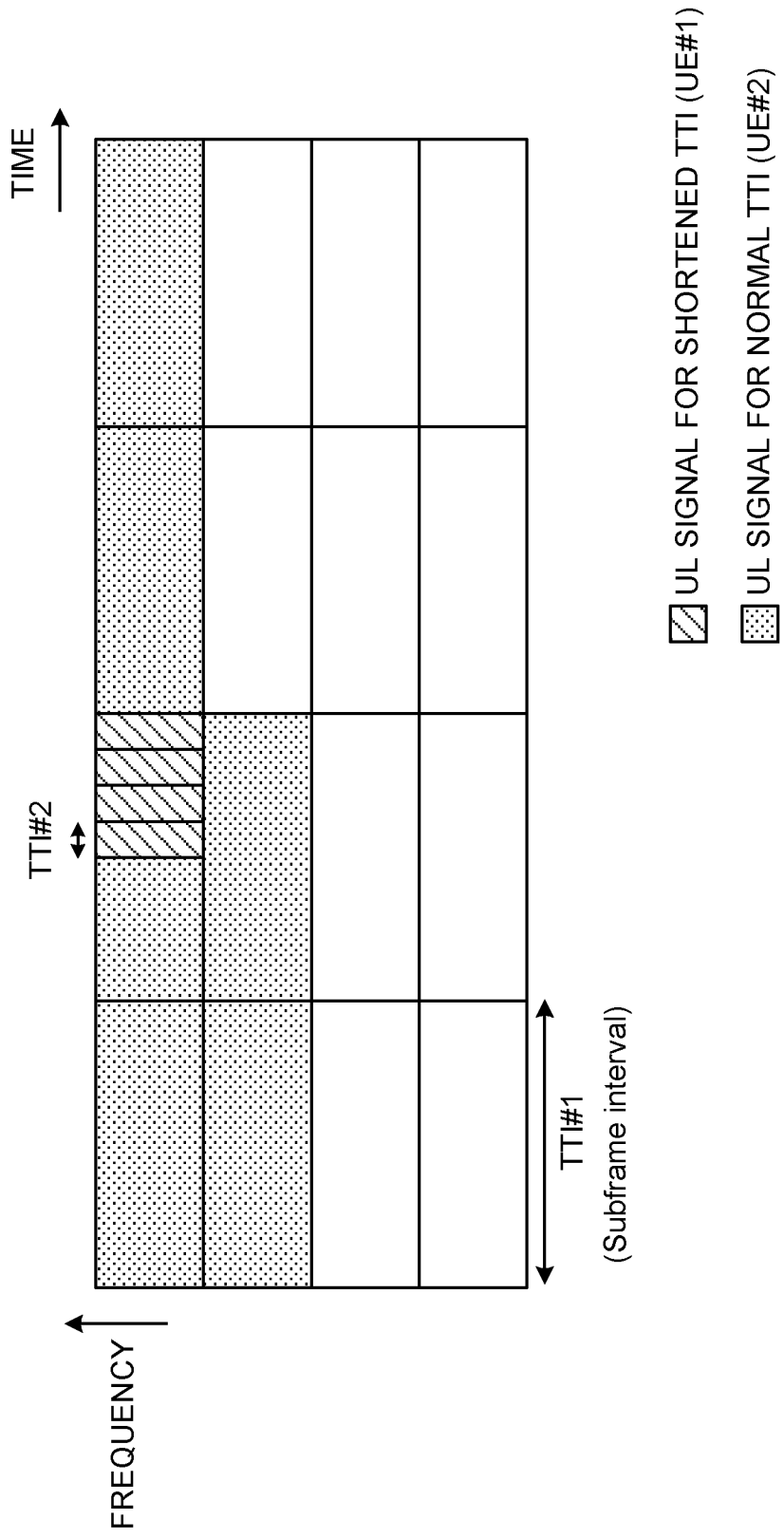
FIG. 4 is a diagram to show an example of transmitting contention-based UL data in consecutive shortened TTIs.

FIG. 4 shows a case where a UL signal for shortened TTIs (for example, a PUSCH for shortened TTIs), which is to be transmitted by using contention-based UL, and existing UL data (existing PUSCH) are allocated to the same frequency field. In this case, the UL signal for shortened TTIs and the existing UL data may interfere with each other, and the radio base station may be unable to receive these. In this way, when allocating UL data to be transmitted in shortened TTIs and UL data to be transmitted in normal TTIs are allocated to a common resource, there is a risk of collision.

Figure 5:
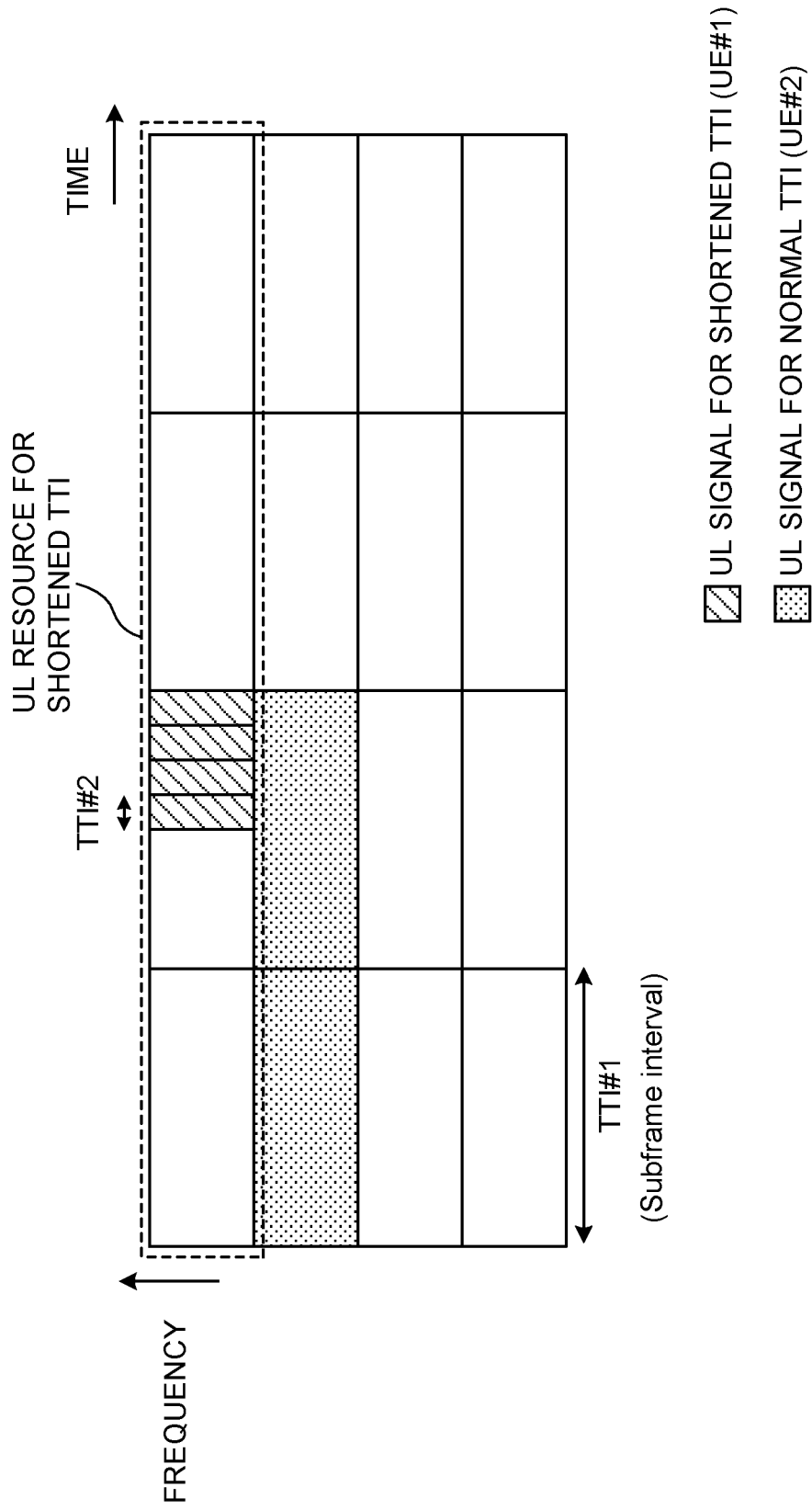
FIG. 5 is a diagram to show an example of configuring UL resources for shortened TTIs.

In order to prevent collision with existing UL data (UL data applying non-contention-based UL data transmission), it may be possible to configure a dedicated resources (resources for shortened TTIs) for contention-based UL data transmission (see FIG. 5). However, in this case, even when contention-based UL data transmission does not take place, existing UL data cannot be allocated to these resources, so that the spectral efficiency may drop.

Therefore, the present inventors have focused on the point that it is effective to make a configuration to reduce the possibility that at least one UL transmission, among multiple UL transmissions where contention-based UL data transmission is applied, overlaps with another UL signal, and arrived at the present invention. To be more specific, the present inventors have focused on the point that multiple pieces of contention-based UL data are distributed and arranged, and come up with the idea of allocating multiple pieces of contention-based UL data to different shortened TTI resources by applying frequency hopping.

Now, embodiments of the present invention will be described below in detail with reference to the accompanying drawings. Note that, the present embodiment can be suitably applied to UL data such as URLLC that requires latency reduction, but this is by no means limiting. The present embodiment can be applied to various services (for example, background communication, small packet communication, etc.). Also, the present embodiment is not limited to UL data, and can be applied to other UL signals and/or UL channels.

Also, the present embodiment can be employed even when UL synchronization is established or when UL synchronization is not established. Also, the states a user terminal may be in according to the present embodiment include an idle state, an RRC-connected state and a state that is newly defined for contention-based UL data transmission.

(First Aspect)

In accordance with a first aspect of the present invention, a case where transmission is controlled by applying frequency hopping to UL signals (for example, UL data), to which contention-based UL data transmission is applied, will be described.

Figure 6:
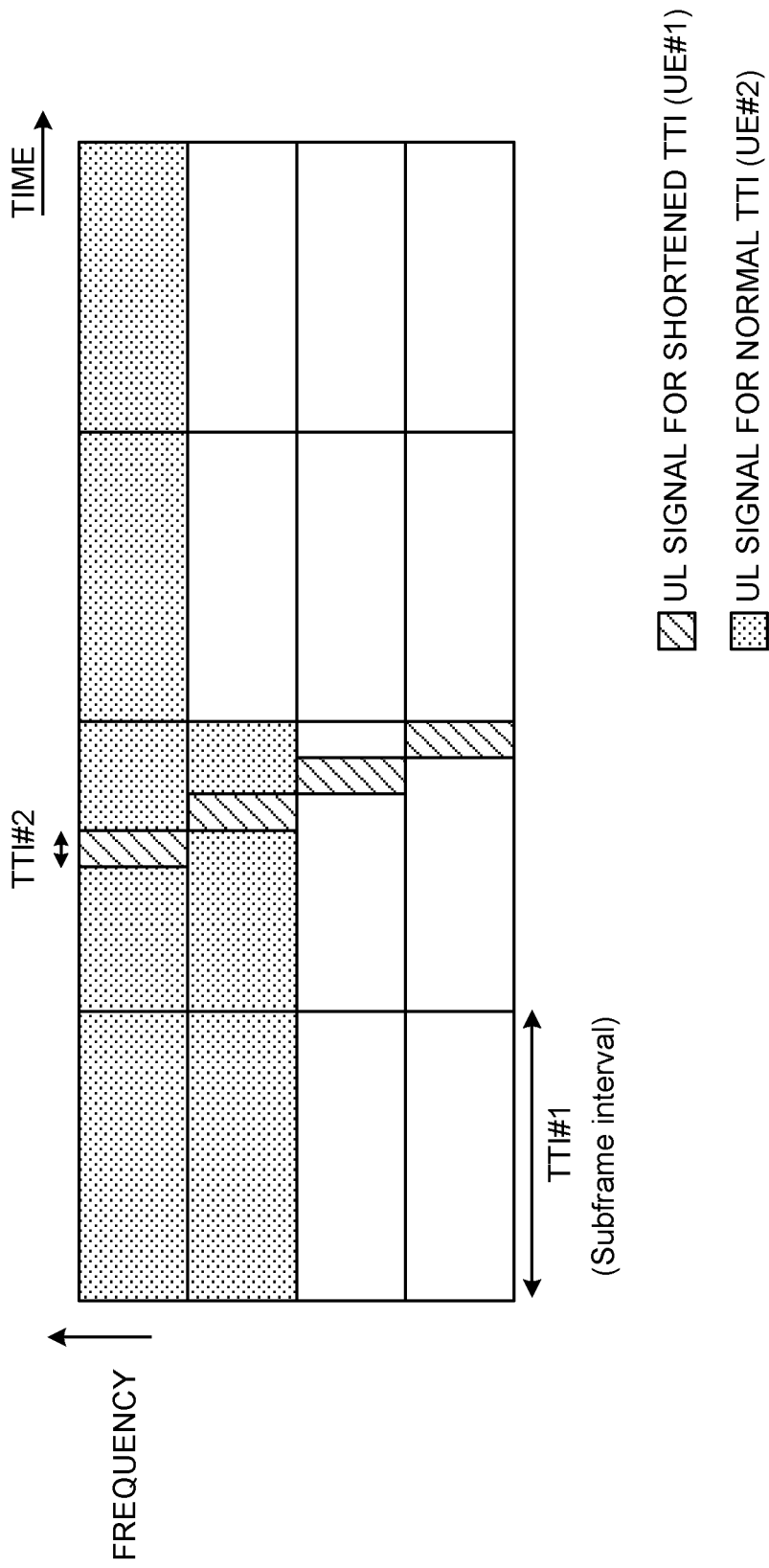
FIG. 6 is a diagram to show an example of contention-based UL data transmission using frequency hopping.

FIG. 6 shows an example of transmitting a UL signal that contention-based UL data transmission is applied by hopping in the frequency direction. That is, frequency hopping is applied to shortened TTI resources for use in contention-based UL data transmission. In FIG. 6, a common resource can be configured for UL signal that are allocated in units of first TTIs (for example, subframes), and UL signals that are allocated in units of second TTIs (shortened TTIs), which are shorter in TTI duration than first TTIs.

The user terminal allocates multiple contention-based UL signals to different frequency fields by applying frequency hopping. For example, as shown in FIG. 6, the user terminal transmits UL signals using a plurality of consecutive shortened TTIs #2 (shortened TTIs that are continuous in the time direction) included in the same subframe (TTI #1). Note that frequency hopping may use shortened TTIs included in different subframes or use discontinuous shortened TTIs.

FIG. 6 shows a case where two of the four UL signals that are transmitted in varying frequency fields collide with other UL signals (for example, UL data of another user terminal), and the remaining two UL signals can avoid collision with other UL signals. In this way, when a plurality of contention-based UL signals (for example, UL signal of the same content), are distributed in the frequency direction and transmitted, compared to when UL signals are continuously transmitted in one frequency, it is possible to reduce the possibility that all UL signals collide with other UL signals. By this means, contention-based UL signals can be appropriately transmitted and the latency can be reduced.

Information about the frequency hopping pattern can be reported to the user terminal as a resource for contention-based access, in higher layer signaling (for example, RRC signaling, broadcast information, MAC control information, etc.). In this case, the radio base station may report the frequency hopping pattern itself to the user terminal, or report information (information about part of frequency hopping) for determining the frequency hopping pattern on the user terminal side.

Alternatively, the frequency hopping pattern may be determined by radio parameter and so on. For example, the frequency hopping pattern may be determined based on at least one of the frequency band, the number of frequency resources, the number of shortened TTIs #2 included in TTI #1 (subframe), the subcarrier spacing, the cell ID, the user identification number (UE-ID), the indices of TTI #1 and/or TTI #2, and the system frame number (SFN).

Figure 7:
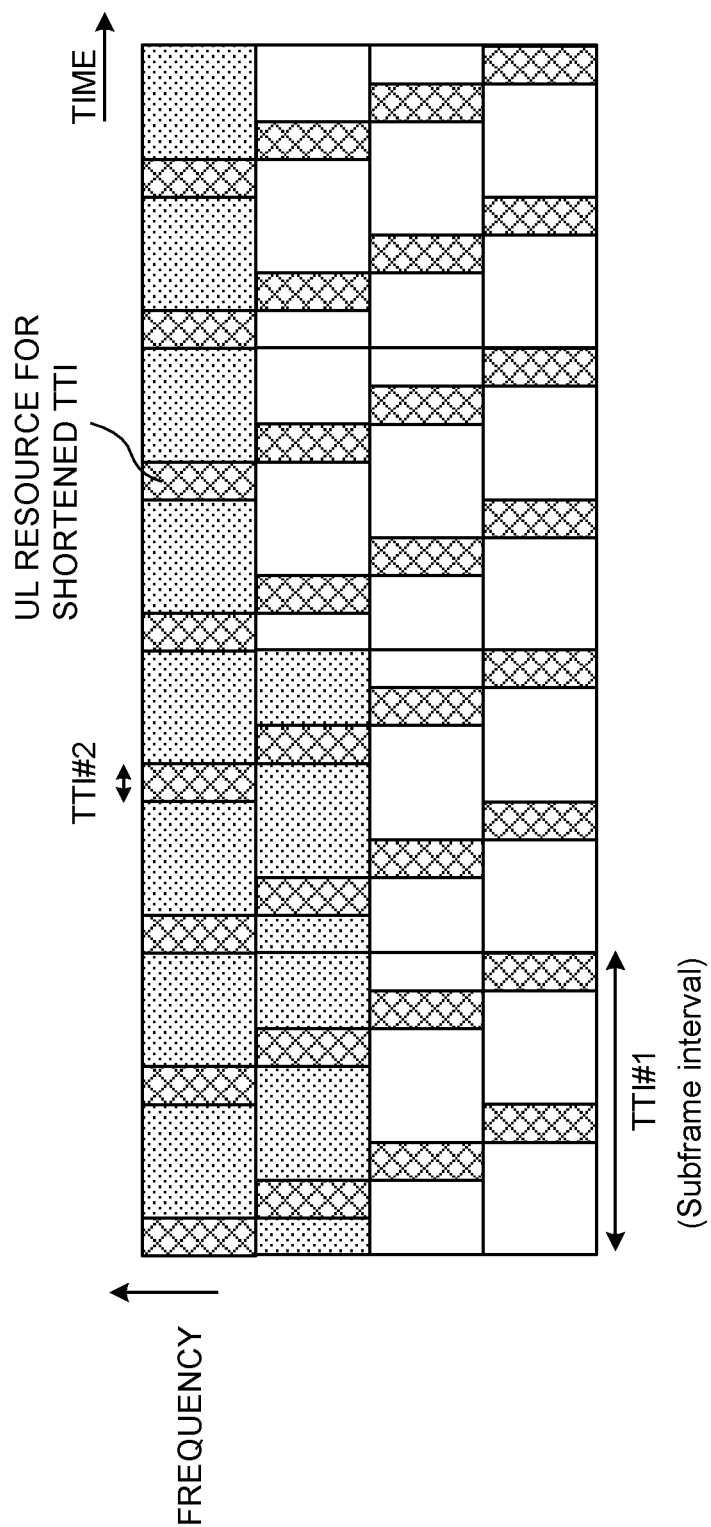
FIG. 7 is a diagram to show an example of a frequency hopping pattern that is configured in UL resource for shortened TTIs.

Also, when frequency hopping is applied to shortened TTI resources for use in contention-based UL data transmission, resources for shortened TTIs (hopping pattern) should be configured to be evenly distributed over different frequencies in TTI #1 (subframe). For example, different shortened TTI resources are configured in different resource blocks (RB) or RB groups (see FIG. 7). An RB group can be comprised of a plurality of RBs.

Furthermore, a plurality of different hopping patterns (shortened TTI resources), among which at least one of the frequency resource width, the density of arrangement in the time direction and the density of arrangement in the frequency direction varies, may be configured (see FIG. 8A). FIG. 8A shows the case of configuring a first hopping pattern in which shortened TTI resources are configured across multiple resource blocks or multiple RB groups, and a second hopping pattern in which the frequency resource width is smaller than in the first hopping pattern and the arrangement density is small.

In this way, by configuring multiple hopping patterns with different frequency resource widths and densities of arrangement, it is possible to reduce the contention of contention-based UL signals to which different hopping patterns are applied. In addition, by selecting hopping patterns depending on the situation of communication and the signal type, it is possible to flexibly control the amount of contention-based UL signals to transmit.

Also, a plurality of hopping patterns that are arranged regularly may be configured (see FIG. 8B). FIG. 8B shows a case of configuring a plurality of hopping patterns obtained by shifting the same pattern in the frequency direction and/or the time direction. Frequency resources of the hopping pattern may be configured consecutively or non-consecutively. In this way, by configuring multiple hopping patterns, it is possible to reduce the contention of contention-based UL signals to which different hopping patterns are applied.

Furthermore, in the case of transmitting, in addition to UL data, randomly selected preambles and control information for the UL data, frequency hopping may be configured in common, or may be configured separately. When frequency hopping is configured separately, different frequency hopping may be applied, or frequency hopping may not be applied to certain channels.

(Second Aspect)

In accordance with a second aspect of the present invention, a case where transmission is controlled by applying frequency hopping to DL signals transmitted in shortened TTIs will be described.

In order to achieve latency reduction in communication, when DL data and so on that require latency reduction occurs, depending on the timing this DL data is generated, DL transmission may be carried out even in the middle of a subframe. For example, when a DL signal that requires latency reduction occurs in the middle of a subframe, the radio base station schedules this data using a PDCCH that is transmitted in shortened TTIs (see FIG. 9). By this means, it is possible to transmit data that requires latency reduction in units of shortened TTIs without waiting for the end of the subframe, so that the latency of the DL transmission can be reduced.

Figure 9:
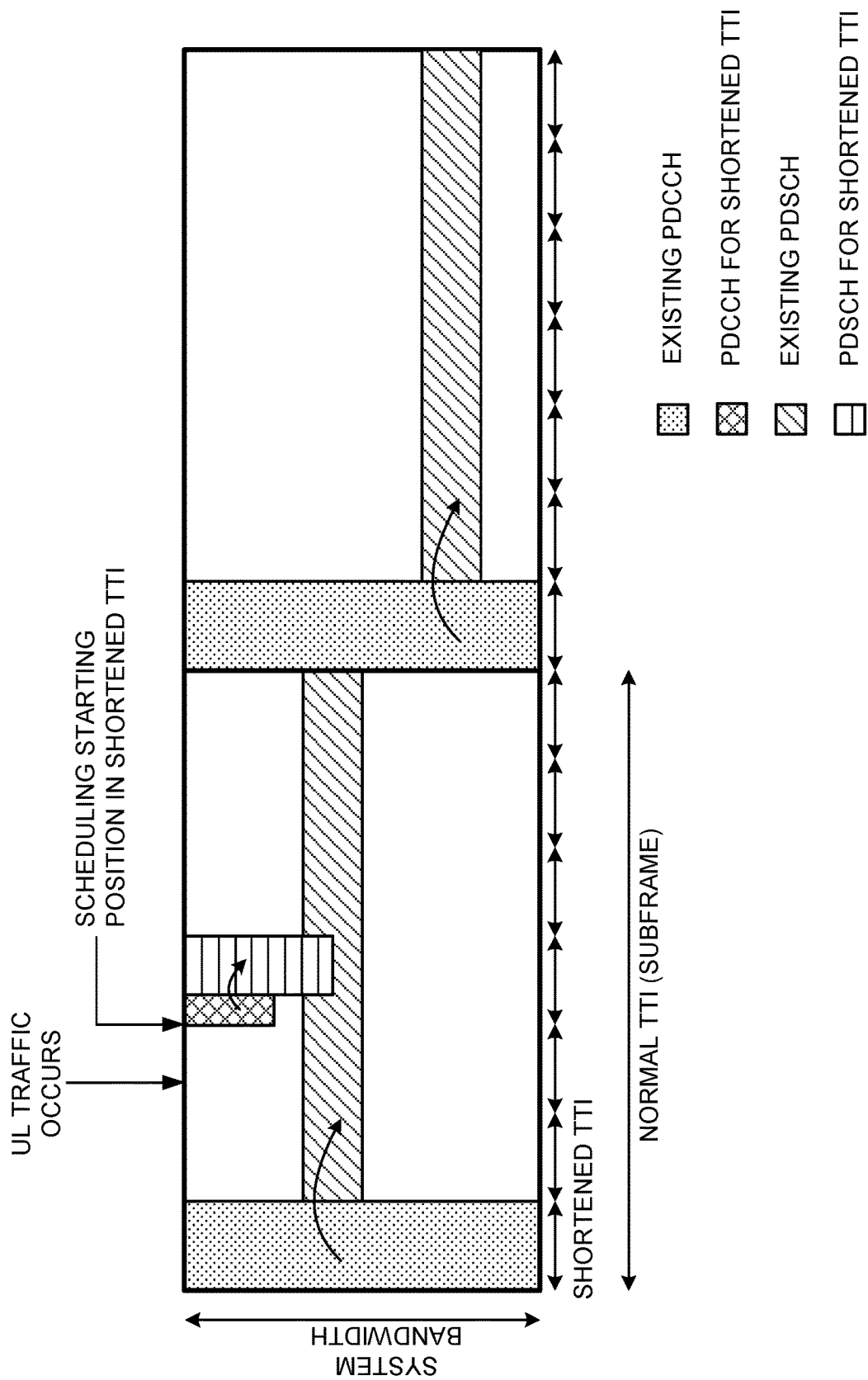
FIG. 9 is a diagram to show an example of the method of allocating DL signals in normal TTIs and shortened TTIs.

Meanwhile, if the radio base station happens to schedule data (for example, existing PDSCH) over the subframe in an existing PDCCH, there is a possibility that the PDSCH for shortened TTIs and the existing PDSCH may overlap in this subframe (see FIG. 9). Therefore, it is effective to apply frequency hopping to DL signals (for example, PDSCH) for shortened TTIs as well.

Figure 10:
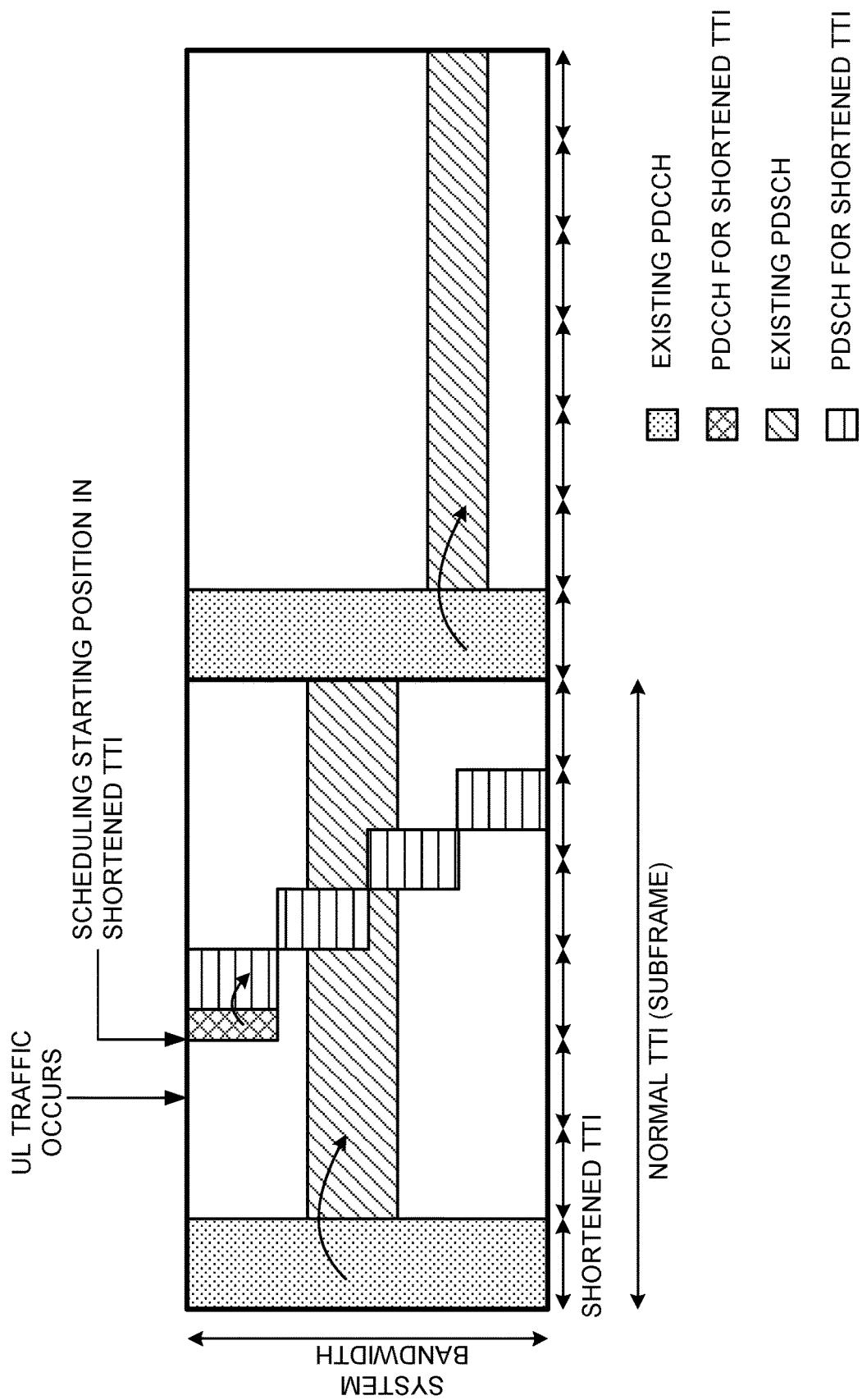
FIG. 10 is a diagram to show an example of the method of transmitting DL signals for shortened TTIs where frequency hopping is applied.

FIG. 10 is a diagram to show an example of applying frequency hopping to a PDSCH for shortened TTIs. FIG. 10 shows a case where multiple DL signals for shortened TTIs are allocated along the frequency direction. FIG. 10 shows a case where two DL signals out of four DL signals that are transmitted in different frequency fields collide with other DL signals (for example, DL data of another user terminal), but where the remaining two DL signals can avoid collision with other DL signals. In this way, when DL signals (for example, DL signals of the same content) for a plurality of shortened TTIs are distributed in the frequency direction and transmitted, it is possible to reduce the possibility that all the DL signals collide with other DL signals. Thus, it is possible to appropriately transmit DL signals for shortened TTI and to reduce the latency.

Information about frequency hopping patterns can be reported to the user terminal in an existing PDCCH (downlink control information), a PDCCH for shortened TTIs (downlink control information for shortened TTI), higher layer signaling and so on. FIG. 10 shows the case of reporting the hopping pattern with DCI for shortened TTI. That is, based on downlink control information for shortened TTIs, the user terminal can perform receiving processes by identifying the allocated positions of a plurality of frequency hopping DL signals.

Also, multiple frequency hopping patterns to apply to DL signals to be transmitted in shortened TTIs may be configured in the same way as UL signals. Also, when hopping is applied to UL signal and DL signal transmitted in shortened TTIs, the hopping for UL signals and the hopping for DL signals may be simultaneously configured in the user terminal or configured separately. Also, the hopping patterns applied to the UL signal and the DL signal may be configured in common, or may be configured separately.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 11:
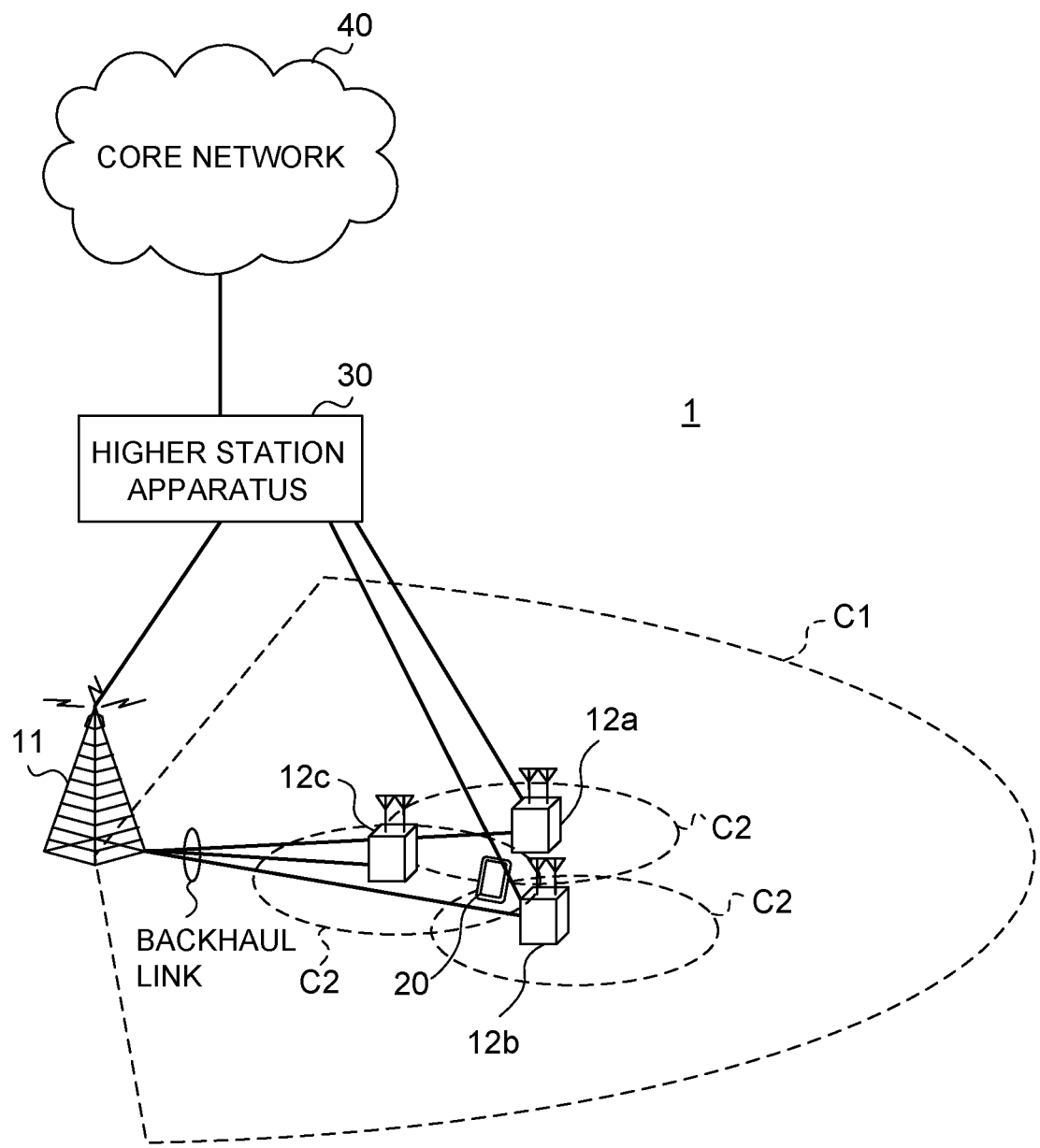
FIG. 11 is a diagram to show an example of a schematic structure of a radio communication system according to the present embodiment.

FIG. 11 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 11 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells. Note that it is possible to adopt a configuration including a TDD carrier, in which shortened TTIs are applied to some of a plurality of cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, DL data channel (PDSCH (Physical Downlink Shared CHannel), which is also referred to as, for example, a "DL shared channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Block) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement information (ACK/NACK) in response to the PUSCH is communicated by the PHICH. The EPDCCH is frequency-division-multiplexed with the PDSCH (downlink shared data channel) and used to communicate DCI and so on, like the PDCCH.

In the radio communication system 1, UL data channel (PUSCH (Physical Uplink Shared CHannel), which is also referred to as "UL shared channel" and so on), which is used by each user terminal 20 on a shared basis, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI (Uplink Control Information)), including at least one of delivery acknowledgment information (ACK/NACK) and radio quality information (CQI), is transmitted by the PUSCH or the PUCCH. By means of the PRACH, random access preambles for establishing connections with cells are communicated.

(Radio Base Station)

Figure 12:
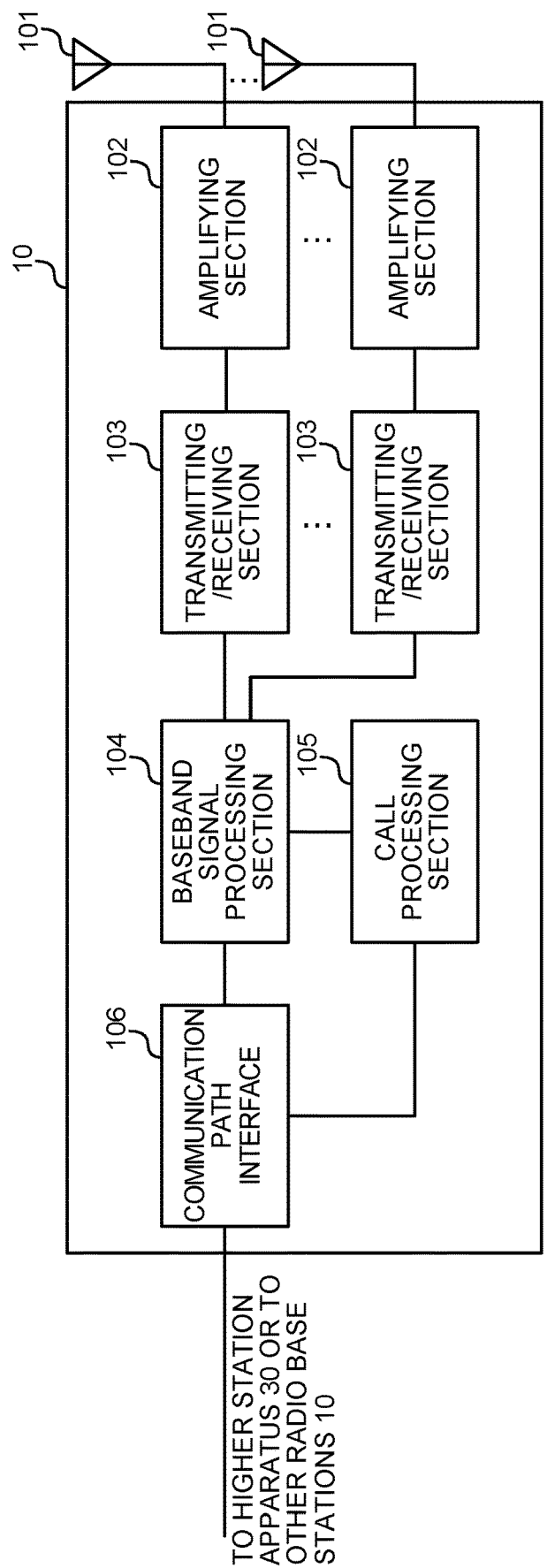
FIG. 12 is a diagram to show an example of an overall structure of a radio base station according to the present embodiment.

FIG. 12 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, DL control signals (DL control channels), DL data signals (DL data channels, DL shared channels and so on), DL reference signals (DM-RS, CSI-RS and so on), discovery signals, synchronization signals, broadcast signals and so on), and receive UL signals (for example, UL control signals (UL control channels), UL data signals (UL data channels, UL shared channels and so on), UL reference signals and so on).

To be more specific, the transmitting/receiving sections 103 receive multiple (a plurality of pieces of) UL data transmitted by the user terminal without UL grants. Also, the transmitting/receiving sections 103 can apply frequency hopping to transmit multiple pieces of DL data using different shortened TTI resources (see FIG. 10). For example, the transmitting/receiving sections 103 transmit information about the frequency hopping pattern of the plurality of pieces of DL data based on higher layer signaling and/or downlink control information.

The transmitting section and the receiving section of the present invention are comprised of a transmitting/receiving section 103 and/or a communication path interface 106.

Figure 13:
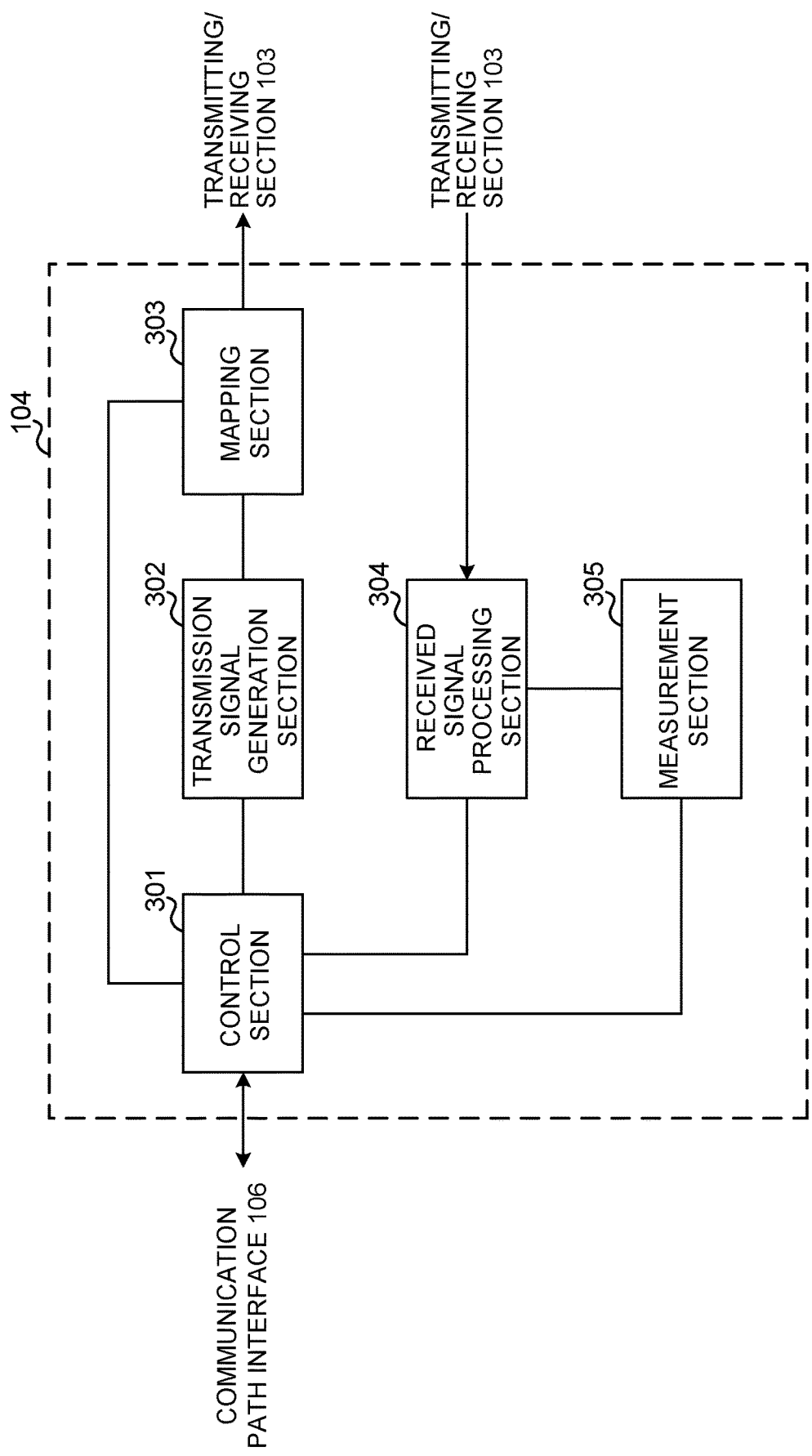
FIG. 13 is a diagram to show an example of a functional structure of a radio base station according to the present embodiment.

FIG. 13 is a diagram to show an example of a functional structure of a radio base station according to one embodiment of the present invention. Note that, although FIG. 10 primarily shows functional blocks that pertain to characteristic parts of the present embodiment, the radio base station 10 has other functional blocks that are necessary for radio communication as well. As shown in FIG. 13, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

Furthermore, the control section 301 may control contention-based UL (CBUL) transmission, in which UL data is transmitted from the user terminals 20 without UL grants.

For example, the control section 301 may determine the above-noted CBUL configuration information, including, for example, UL resources that can be used in contention-based UL data transmission, and so on.

Furthermore, the control section 301 can make decisions pertaining to retransmission control (ACK/NACK/DTX), based on results of decoding in the received signal processing section 304.

The transmission signal generation section 302 generates DL signals (DL control channels, DL data channels, DL reference signals such as DM-RSs, and so on) based on commands from the control section 301 and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (UL control channels, UL data channels, UL reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, the received signal processing section 304 outputs at least one of a preamble, control information and UL data to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

(User Terminal)

Figure 14:
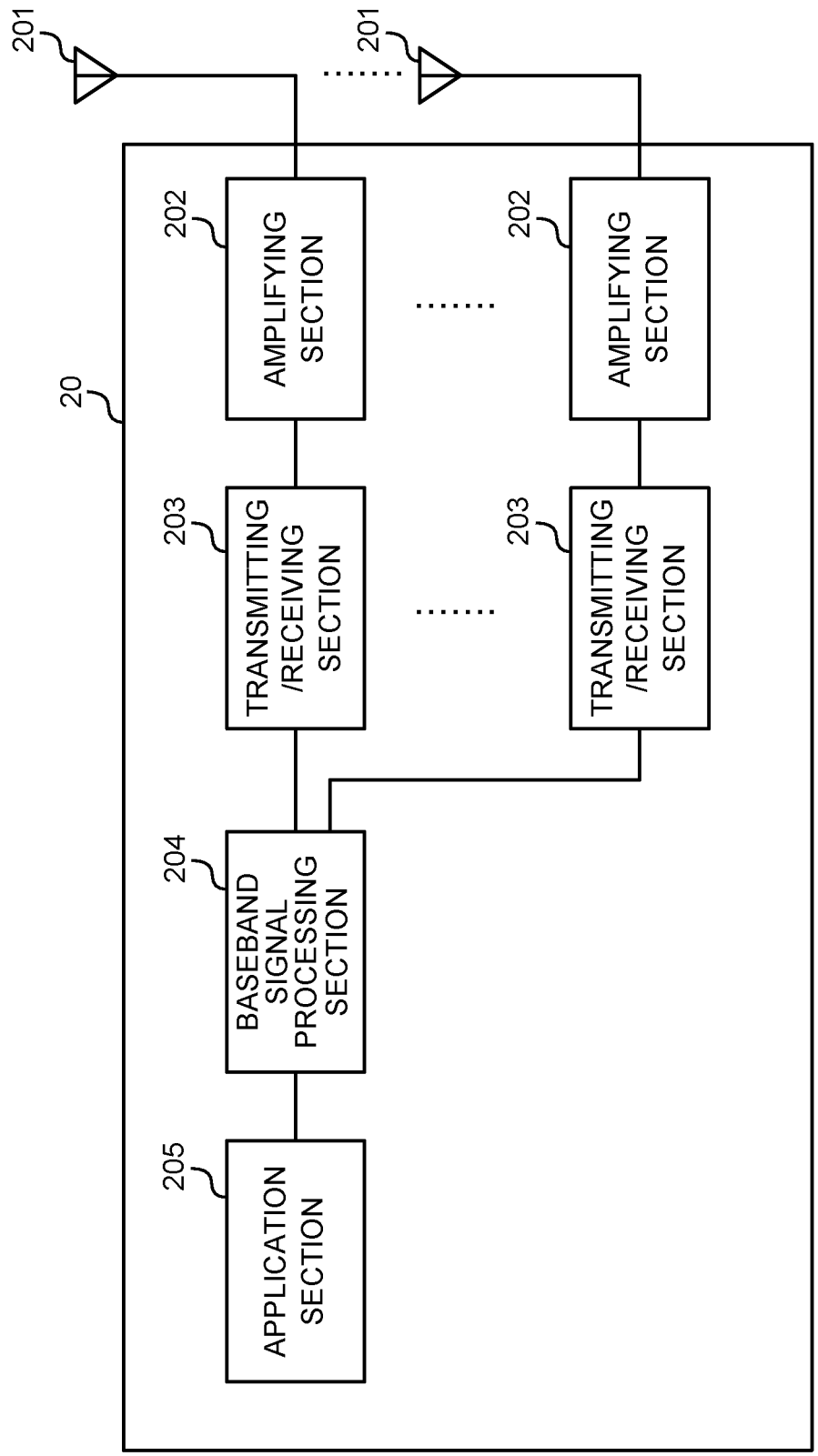
FIG. 14 is a diagram to show an example of an overall structure of a user terminal according to the present embodiment.

FIG. 14 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, in the DL data, the system information and the higher layer control information are also forwarded to the application section 205.

Meanwhile, the UL data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals (for example, DL control signals (DL control channels), DL data signals (DL data channels, DL shared channels and so on), DL reference signals (DM-RS, CSI-RS and so on), discovery signals, synchronization signals, broadcast signals and so on), and transmit UL signals (for example, UL control signals (UL control channels), UL data signals (UL data channels, UL shared channels and so on), UL reference signals and so on).

To be more specific, the transmitting/receiving sections 203 transmit a plurality of pieces of UL data without UL grants from the radio base station. Also, the transmitting/receiving sections 203 can receive multiple pieces of DL data, to which frequency hopping is applied and which are allocated to different shortened TTI resources (see FIG. 10). For example, the transmitting/receiving sections 203 determines the frequency hopping pattern of the plurality of pieces of DL data based on higher layer signaling and/or downlink control information transmitted from the radio base station.

Figure 15:
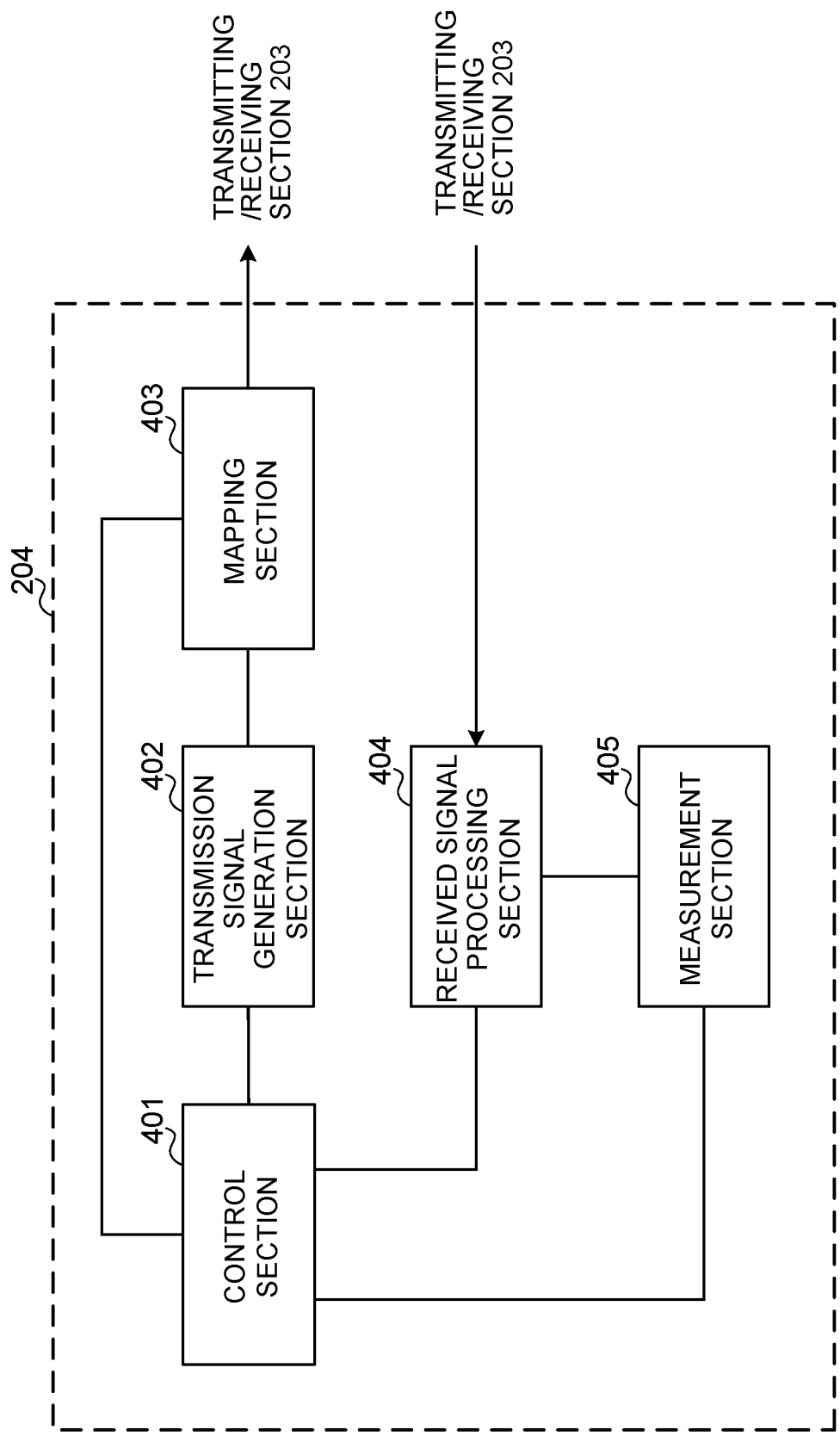
FIG. 15 is a diagram to show an example of a functional structure of a user terminal according to the present embodiment.

FIG. 15 is a diagram to show an example of a functional structure of a user terminal according to one embodiment of the present invention. Note that, although FIG. 15 primarily shows functional blocks that pertain to characteristic parts of the present embodiment, the user terminal 20 has other functional blocks that are necessary for radio communication as well. As shown in FIG. 15, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires a DL control channel and a DL data channel transmitted from the radio base station 10 from the received signal processing section 404. To be more specific, the control section 401 controls the transmitting/receiving sections 203 and the received signal processing section 404 to blind-decode the DL control channel to detect DCI, and receive the DL data channel based on the DCI. In addition, the control section 401 estimates channel gain based on DL reference signals and demodulates the DL data channel based on the estimated channel gain.

The control section 401 may control transmission of retransmission control information (for example, HARQ-ACK, etc.) transmitted in a UL control channel or a UL data channel, based on results of deciding whether or not retransmission control is necessary for DL data channels, and so on. Furthermore, the control section 401 may control transmission of channel state information (CSI), which is generated based on DL reference signals.

In addition, the control section 401 controls contention-based UL data transmission (CBUL). For example, the control section 401 controls allocation of a plurality of pieces of UL data to be transmitted in the shortened TTIs individually. To be more specific, the control section 401 allocates a plurality of pieces of UL data to resources of different shortened TTIs by applying frequency hopping.

Furthermore, the control section 401 can allocate a plurality of pieces of UL data to resources of a plurality of shortened TTIs included in a normal TTI (subframe) (see FIG. 6). In addition, the control section 401 can control allocation of a plurality of pieces of UL data by using one of a plurality of frequency hopping patterns having different frequency resource widths and/or arrangement densities (see FIG. 7 and FIG. 8).

The transmission signal generation section 402 generates UL signals (UL control channels, UL data signals, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates UL data channels based on commands from the control section 401. For example, when a UL grant is included in a DL control channel that is reported from the radio base station 10, the control section 401 commands the transmission signal generation section 402 to generate the UL data channel.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signal include, for example, DL signals transmitted from the radio base station 10 (DL control channels, DL data channels, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of the DL control channel, which schedules transmission and/or receipt of the DL data channel, and performs the receiving process of the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the DL received quality (for example, RSRQ), channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 16:
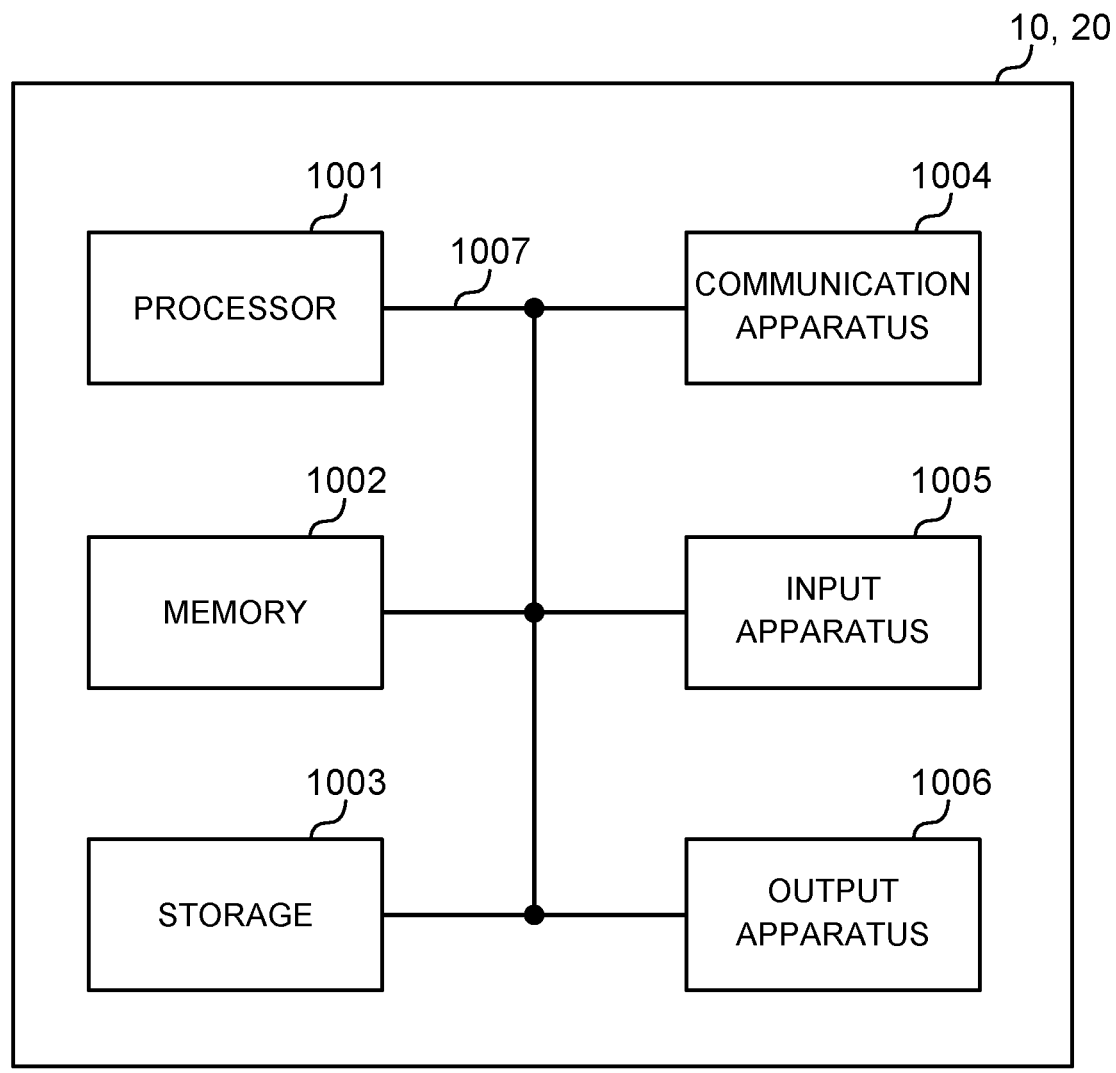
FIG. 16 is a diagram to show an example hardware structure of a radio base station and a user terminal according to the present embodiment.

For example, the radio base station, user terminals and so on according to embodiments of the present invention may function as a computer that executes the processes of the radio communication method of the present invention. FIG. 16 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be comprised of a central processing unit (CPU), which includes interfaces with peripheral apparatus, control apparatus, computing apparatus, and a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be comprised of a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIB s) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB,"

"eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX(registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-096438, filed on May 12, 2016, including the specification, drawings and abstract, is incorporated herein by reference in its entirety.

The invention claimed is:

1. A terminal that communicates using a shorter time interval than a subframe, comprising:
    a transmission section that transmits multiple UL data without a UL grant from a radio base station; and
    a control section that controls allocation of the multiple UL data,
    wherein the control section allocates the multiple UL data to resources of different time intervals by applying frequency hopping.

2. The terminal according to claim 1, further comprising a receiving section that receives DL data transmitted from the radio base station,
    wherein the receiving section receives the DL data that is allocated to resources of the time interval by frequency hopping.

3. The terminal according to claim 2, wherein the receiving section determines a frequency hopping pattern of the DL data based on downlink control information and/or higher layer signaling transmitted from the radio base station.

4. A radio communication method for a terminal that communicates using a shorter time interval than a subframe, the radio communication method comprising:
    transmitting multiple UL data without a UL grant from a radio base station; and
    controlling allocation of the multiple UL data,
    wherein the terminal allocates the multiple UL data to resources of different time intervals by applying frequency hopping.

* * * * *